Sept. 27, 1960 C. B. RICHEY ET AL 2,953,885
HAY CONDITIONER AND MOWER HITCH MEANS
Filed Jan. 10, 1958 6 Sheets-Sheet 1
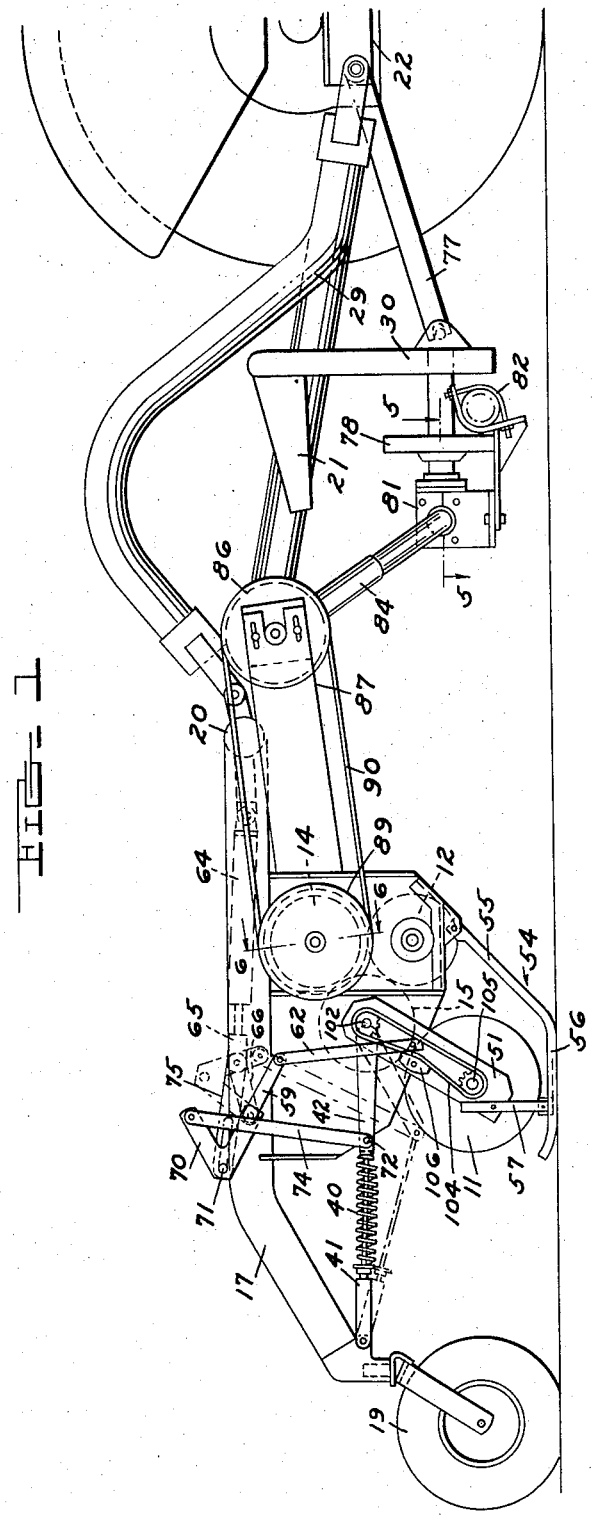
C. B. RICHEY
V. O. HAUSWIRTH
C. E. McKEON
INVENTORS.
BY
E. C. McRAE
J. R. FAULKNER
P. F. HILDER
ATTORNEYS

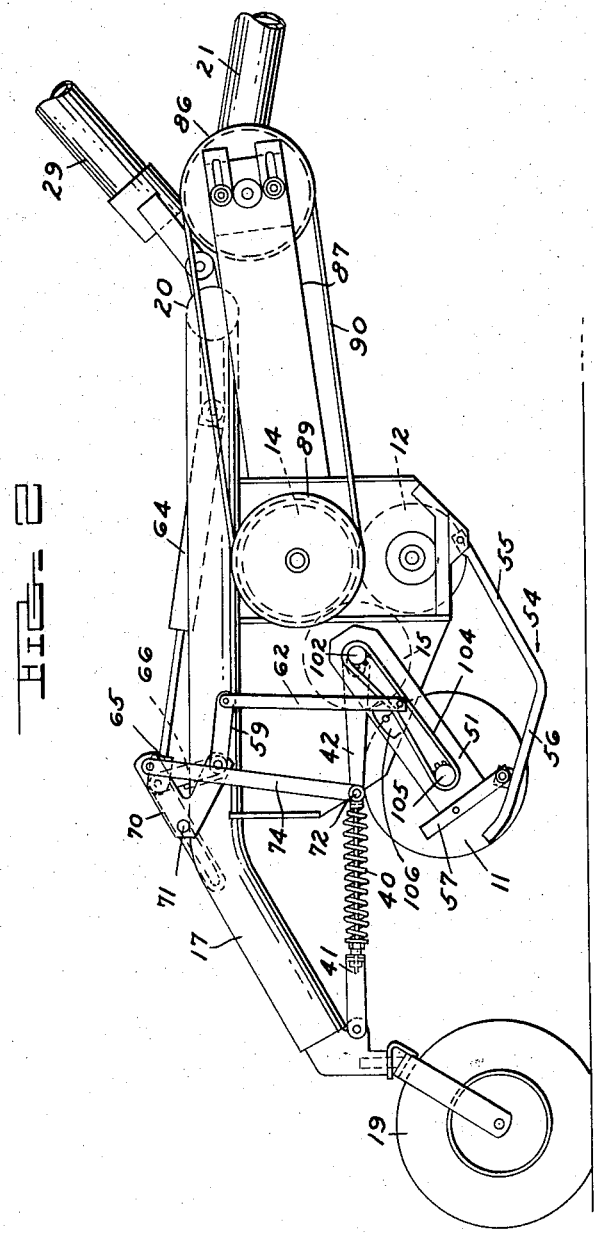

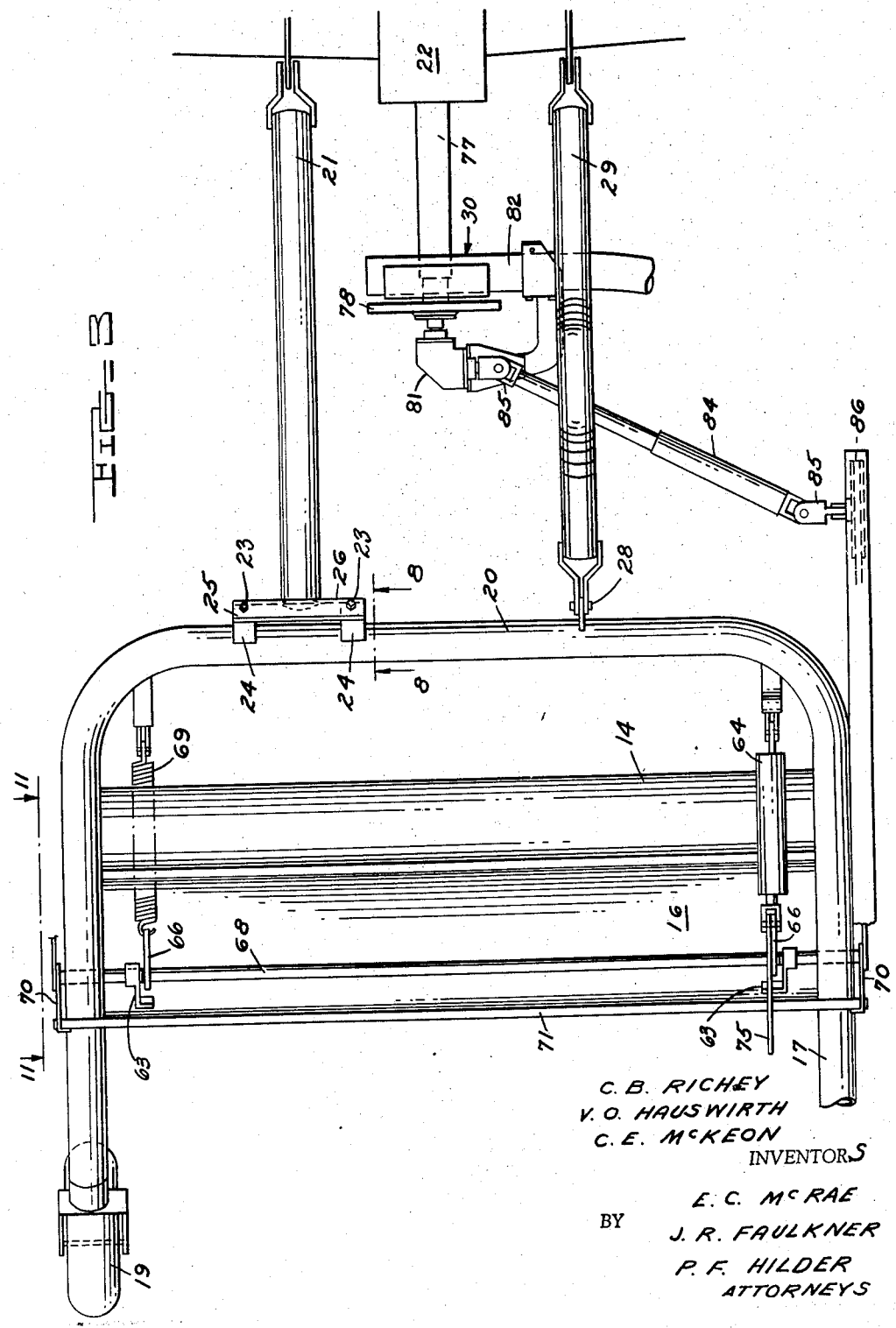

Sept. 27, 1960  C. B. RICHEY ET AL  2,953,885
HAY CONDITIONER AND MOWER HITCH MEANS
Filed Jan. 10, 1958  6 Sheets-Sheet 4
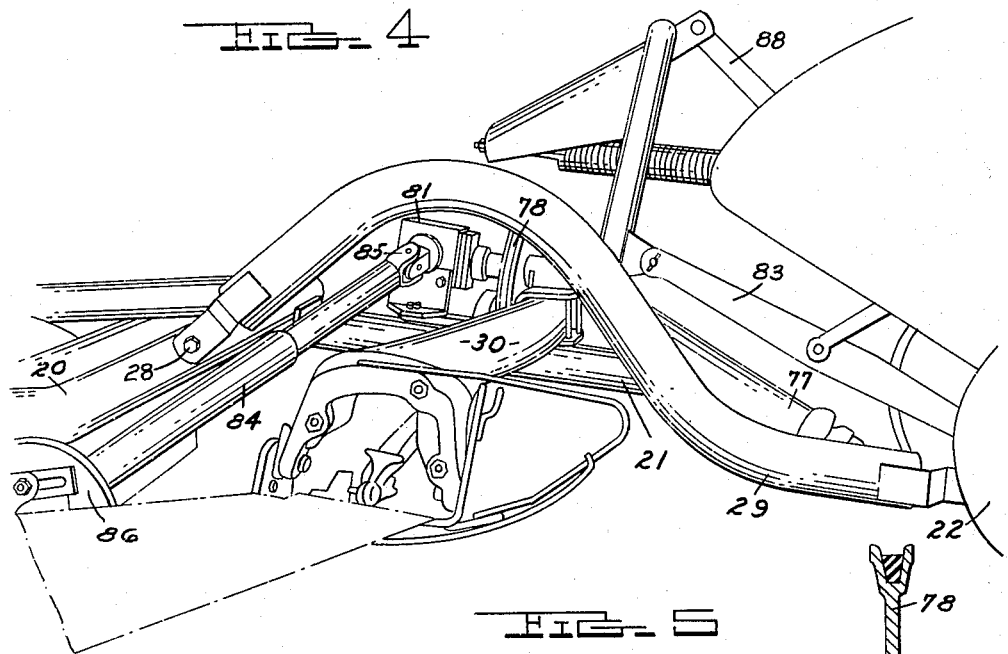
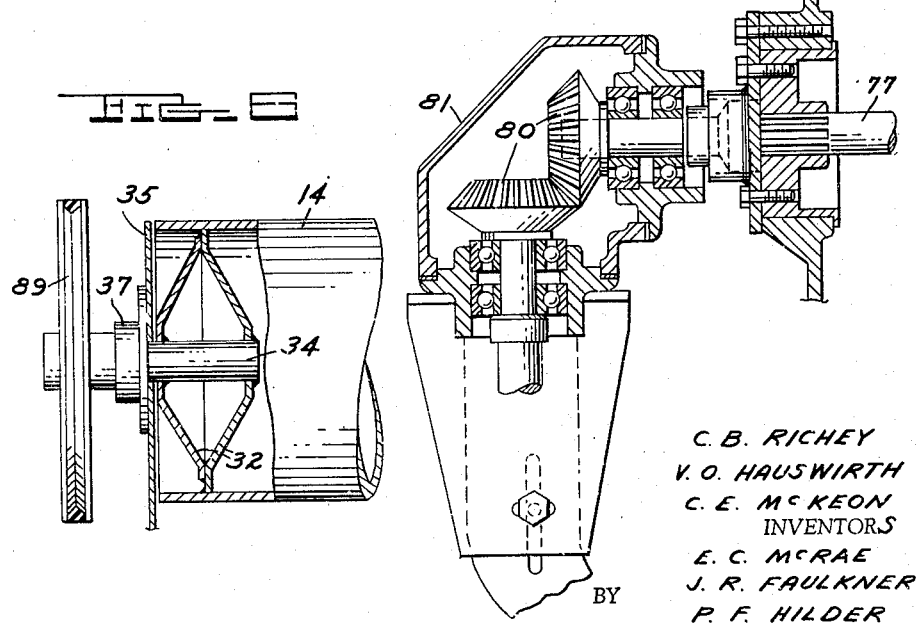
C. B. RICHEY
V. O. HAUSWIRTH
C. E. McKEON
E. C. McRAE
J. R. FAULKNER
P. F. HILDER
INVENTORS
BY
ATTORNEYS

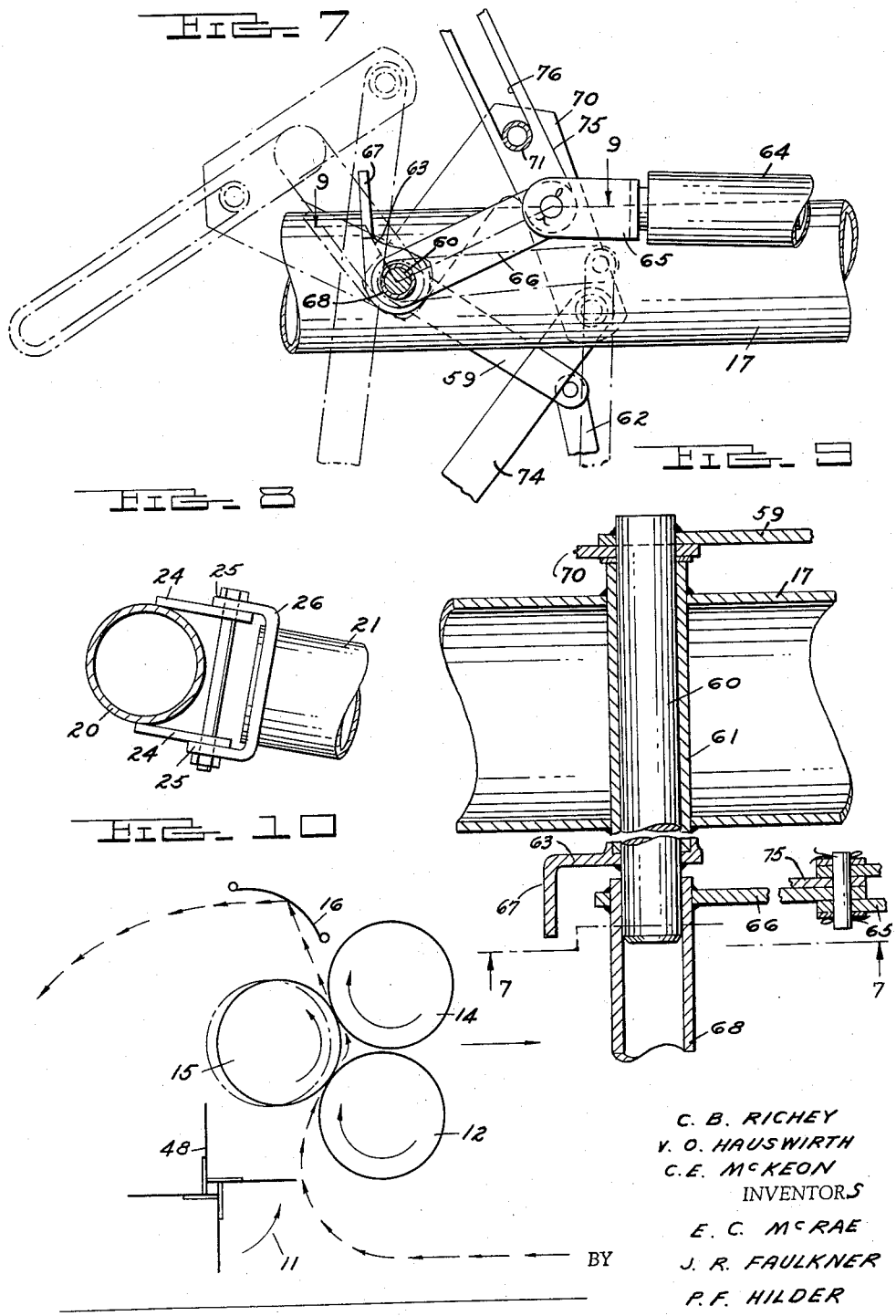

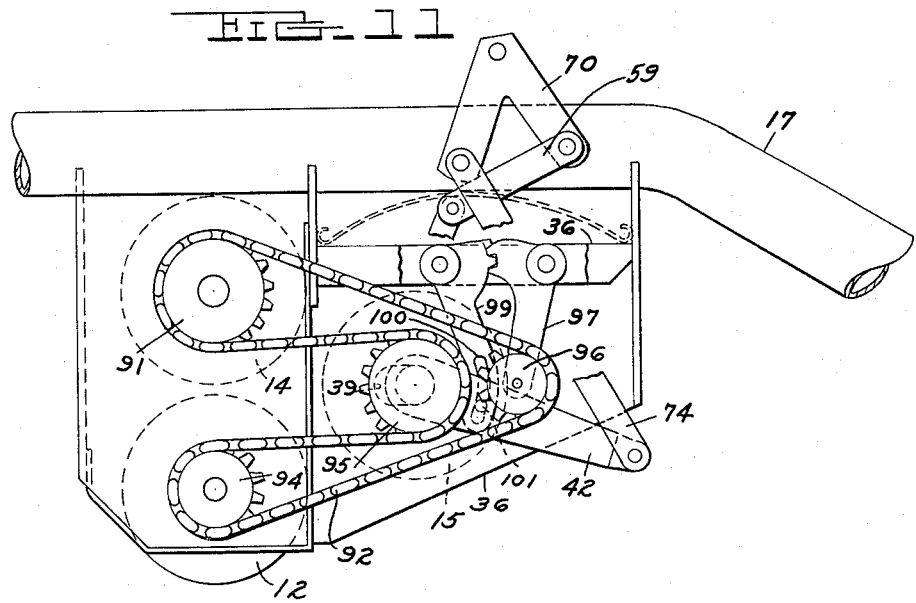
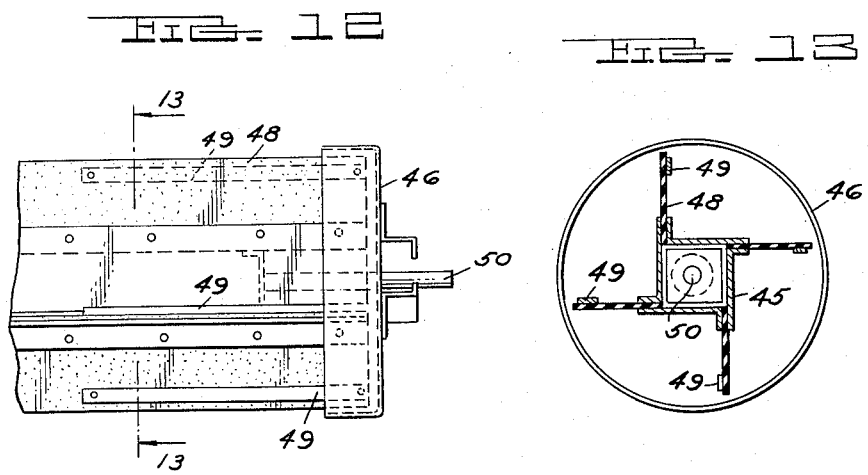

United States Patent Office 2,953,885
Patented Sept. 27, 1960

2,953,885

HAY CONDITIONER AND MOWER HITCH MEANS

Clarence B. Richey, Royal Oak, Vernon O. Hauswirth, Berkley, and Charles E. McKeon, Birmingham, Mich., assignors to Ford Motor Company, Dearborn, Mich., a corporation of Delaware Filed Jan. 10, 1958, Ser. No. 708,250

6 Claims. (Cl. 56—1)

This invention relates to a conditioner for expediting the field drying of hay, including grasses, clovers, alfalfa, and the like.

Hay is usually permitted to dry in the field after mowing until the moisture content has fallen to less than 25% before being collected or baled in the field. The toppings, when mowed, tend to form a more or less uniform layer resting on top of the stubble and providing a substantial unbroken layer for drying. Ordinarily, even in dry weather, it requires 2 to 3 days for the moisture content to fall below about 25%, after which the hay may be baled or otherwise collected without the hazard of spoilage. The present invention relates to a machine for crushing and otherwise conditioning the hay, so as to expedite natural drying of the hay in the field.

The hay conditioner here shown comprises a frame adapted to be pulled behind a tractor and having a rotary crop pickup and a plurality of crushing or treating rolls, the pickup serving to lift the toppings in a substantially unbroken layer and feed into the rolls where the stems are crushed and abraded, after which, the crop is discharged onto the stubble at the rear of the machine for drying. This machine may be used in conjunction with a mower for simultaneous mowing and conditioning of adjacent swaths or the conditioner may be used separately without a mower.

Among the objects of the present invention are to provide a hay conditioner having an improved crop pickup for feeding hay to the conditioning rolls; to provide such a machine having an improved arrangement of conditioning rolls; to provide such a machine in which the rolls are driven at different speeds; to provide an improved linkage for supporting the crop pickup and the conditioning rolls; to provide an improved mechanical drive for such a machine; and generally to improve machines of the type described. Other objects and objects relating to details and economies of construction will appear from the detailed description to follow.

Our invention is clearly defined in the appended claims. In the claims, as well as in the description, parts may at times be identified by specific names for clarity and convenience, but such nomenclature is to be understood as having the broadest meaning consistent with the content and with the concept of our invention as distinguished from the pertinent prior art. The best form in which we have contemplated applying our invention is illustrated in the accompanying drawings forming part of this specification in which:

Figure 1 is a right side elevation of a machine of the present invention, portions of a tractor and a mounted mower being shown in conjunction with the machine and the links for supporting the mower from the tractor being omitted.

Figure 2 is a right side elevation on a somewhat larger scale of the machine, the forward portions of the draw bars and the power drive from the mower to the machine being omitted.

Figure 3 is a top plan view of the machine, one of the trailing caster wheels and rear right portion of the frame being omitted, the mower and rear portion of the tractor being shown and the links for supporting the mower from the tractor being omitted.

Figure 4 is an enlarged isometric view showing the draw bar connections and drive connection between the machine of the present invention and a tractor and mower.

Figure 5 is an enlarged somewhat diagrammatic illustration partially in horizontal section along the line 5—5 of Figure 1 of the right angle drive at the rear of the mower.

Figure 6 is a large detailed view partially in section along the line 6—6 of Figure 1 of the end portion of one of the rolls.

Figure 7 is a somewhat diagrammatic enlarged side elevation of a portion of the linkage for lifting and dropping the crop pickup, and releasing and restoring the pressure between the conditioning rolls, portions of the mechanism being shown in vertical section taken along the line 7—7 of Figure 9.

Figure 8 is an enlarged detailed view partially in section along the line 8—8 of Figure 3, showing the connection of one of the draw bars to the frame of the machine.

Figure 9 is a large horizontal section taken along the line 9—9 of Figure 7 of a portion of the controls for the crop pickup and conditioning rolls.

Figure 10 is a diagrammatic vertical section of the machine, indicating the general method of operation.

Figure 11 is an enlarged somewhat diagrammatic side elevation of the roll-driving mechanism and associated parts at the left side of the machine, as indicated by line 11—11 of Figure 3.

Figure 12 is an enlarged somewhat diagrammatic elevation of an end of the crop pickup.

Figure 13 is a cross section of an end portion of the crop pickup, taken generally along line 13—13 of Figure 12.

Before commencing the detailed description of the machine, a general description of operation of the machine will be given. Referring to Figure 10, the machine essentially consists of a crop pickup 11 and two or more conditioning rolls, in the present instance three rolls 12, 14 and 15. The pickup 11 is arranged to contact the layer of toppings and sweep it upwardly in a substantially unbroken sheet between a pair of juxtaposed contour rotating conditioning rolls 12 and 15, the opposed surfaces of the rolls turning away from the pickup so as to draw the layer of toppings between the rolls. Preferably, the layer of topping is then passed between roll 15 and the third roll 14 for further treatment after which the toppings in the layer are directed against a baffle 16 which directs the toppings downwardly onto the field behind the machine. Preferably, the roll 15 is spring pressed against the rolls 12 and 14 to provide a more or less uniform pressure between the rolls despite varying thicknesses of crop being processed there between.

Referring now to Figure 1, the machine of the present invention comprises a U-shaped frame 17 which may be formed from pipe, and which is supported at the rear by a pair of caster wheels 19, 19 pivotally mounted on the rear ends of the frame 17. The forward, closed end 20 of the frame is supported by a forwardly extending, generally horizontal draw bar 21 which is rigidly connected to the frame and extends forwardly for connection to the rear axle portion 22 of a tractor. The connection between the frame 17 and the rear end of the draw bar 21, which is shown in detail in Figure 8, may consist of two pairs of forwardly extending parallel plates or tabs 24 fixed to the frame and being received between the rearwardly extending parallel legs 25, 25 of a channel 26, fixed to the rear end of the draw bar 21. A pair of bolts 23, 23 extending through the legs 25, 25 of the channel and the plates 24 form a rigid detachable connection between the draw bar 21 and the frame 17.

A second draw bar 29 extending between the frame 17 and the tractor 22 serves as an additional draft connection between the tractor rear axle and hay conditioner. The draw bar 29 is upwardly arched as indicated in Figures 1 and 4 to provide clearance for lifting the mower 30 and for drive shaft 84 for driving the hay conditioner as will be explained. The connections at both ends of the draw bar 29 and the forward end of the draw bar 21 may be horizontal bolt or pin connections to permit the tractor rear axle 22 and frame 17 to rock or pitch independently of each other, a bolt 28 being shown connecting the draw bar 29 and the frame 17.

The rolls 12, 14, and 15 preferably are formed of substantially smooth sheet metal cylinders having the ends kept closed by frusto-conical end caps 32 formed of a pair of opposed frusto-conical plates. An axle 34 projecting from each end of the rolls and held by the end cap 32 serves as a pivot for supporting the rolls. The rolls 12, 14, and 15 are rotatably supported from flat vertical plates 35 and 36 located on each side of the U-shaped frame 17. Preferably, an anti-friction bearing 37 mounted on the plates 35 or 36 rotatably receives the axle 34 from each roll. (See Figure 6.) Preferably, the roll 14 is mounted substantially directly above the roll 12. These rolls rotate in the same direction and with a slight space between the rolls. (Figure 10.) Both rolls are mounted on fixed axes, and the axes of the rolls are parallel.

The roll 15 is supported by the vertical plates 35 and 36 for limited movement towards and away from the rolls 12 and 14. Preferably, roll 15 is mounted intermediate and behind the other rolls, and the end bearings 37, 37 of roll 15 are received within horizontally elongated slots in the plates 35 and 36, one slot 39 in the plate 36 being shown. These slots permit the roll 15 to be crowded rearwardly away from the rolls 12 and 14 as the thickness being processed requires.

The ends of the roll 15 are biased forwardly by a spring 40, a telescoping link 41 urged apart by the spring, and a fixed length link 42 pivotally connected between the forward end of the telescoping link 41 and the bearing 37 at each end of roll 15. The arrangement is such that when the links 41 and 42 are aligned as in the full line position of Figure 1, the bearings 37, 37 supporting roll 15 are urged into the forward ends of the slots in the plates 35 and 36, closing the space between roll 15 and rolls 12 and 14, but permitting the roll 15 to move rearwardly away from the rolls 12 and 14 by compression of the spring 40. However, by lowering the connection between the telescoping and fixed length links 41 and 42, as indicated in Figure 1, the spring pressure can be released from roll 15, permitting it to move rearwardly as permitted by the slots in the plates 35 and 36.

The crop pickup 11 extends for substantially the same length as the rolls 12, 14, and 15, and is located below and slightly to the rear of roll 15 so as to feed the crop upwardly into the space between the rolls 12 and 15. (See Figure 10.) The crop pickup is comprised of a paddle wheel or impeller formed of a plurality of generally flat flaps of elements 48 which preferably are somewhat flexible and may be formed of rubber belting stock extending for the length of the pickup and secured to a square hub 45. In operation, the pickup is rotated at a relatively rapid speed with the lower edges of the pickup as it is rotated moving in the direction of travel of the tractor so as to lift the crop, partially by actual contact of the flaps 48 with the crop and partially by the current of air created by rotation of the pickup. The end cap 46 (Figures 12 and 13) has an inwardly directed circular peripheral flange which overlies the end portions of the flaps 48 to prevent wrapping of the crop about the ends of the pickup. Preferably, the end cap 46 does not rotate with the pickup 11. In addition, if the flaps 48 are to be formed of flexible material, metal stiffeners 49 preferably are secured along the end portion of the flaps, as indicated in Figure 12, to reinforce the end portions of the flaps against bending backwards and promoting wrapping of the crop about the axles at the ends of the pickup.

The crop pickup 11 is provided with an axle 50 projecting from each end of the square hub 45, which is received within an anti-friction bearing, not shown. Similar swinging links 51, located one at each end of the crop pickup 11, one link being shown, support the crop pickup for raising and lowering. The upper ends of the swinging links 51 pivot about the axis of the roll 15 and the axis of the crop pickup 11 is located adjacent the lower end of these links. The links 51 can swing independently to permit the crop pickup to adjust to ground contour.

The height of the crop pickup 11 above the ground is regulated by a pair of shoes 54, 54 located one each side of the crop pickup. The shoes 54 have a forwardly, upwardly extending forward portion 55 pivotally connected with the lower edge of the adjacent side plate 35 or 36 for movement about a horizontal pivot. The rear portion 56 of each shoe 54 has an extended ground contacting surface and when the crop pickup 11 is in lowered, operating position, the portion 56 of each shoe 54 is in contact with the ground and supports the pickup 11 at the proper elevation by means of an upwardly extending link 57 pivotally connected between the shoe 54 and the lower end portion of the adjacent swinging link 51. (See Figure 1.) When the crop pickup 11 is raised, each shoe 54 pivots upwardly about its forward end and the links 57, 57 pivot rearwardly as indicated in Figure 2.

The lift mechanism for the crop pickup 11 comprises a pair of levers 59, 59 which project radially from a pair of aligned transverse shafts to which they are fixed, one shaft 60 being shown (Fig. 9). The transverse shafts are journalled within the side portions of the U-shaped frame 17, being rotatably mounted within sleeves secured to the frame, one sleeve 61 being shown. The free end of each lever 59 is pivotally connected to a link 62 on each side of the machine which connects the lever with the intermediate portion of the swinging link 51 which supports the crop pickup 11.

A single acting hydraulic cylinder 64 has an end pivotally connected to the frame 17 and extends rearwardly, the clevis 65 at the end of the piston rod being pivotally connected with a lever 66, see Figures 7 and 9, which is fixed to an end of a pipe or tube 68 rotatably mounted on the shaft 60 and extending to the opposite shaft 60 (Figures 3 and 9). A lever 63 (Figures 7 and 9) is fixed to the inner end of the shaft 60 and provided with a flange 67 (Figures 7 and 9) which projects opposite the lever 66, the organization being such that actuation of the cylinder 64 rotates the lever 66 in a counterclockwise direction as viewed in Figure 7. After the lever 66 has moved through a substantial arc, it will contact the flange 67 and its further counterclockwise movement carries the adjacent lever 63 with it, rotating the shaft 60 and lifting the crop pickup 11 to the raised inoperative position indicated in Figure 2. A similar lever 66 fixed to the opposite end of tube 68 engages the other lever 63 to lift the other end of the crop pickup 11 in like manner.

Upon releasing the fluid from the hydraulic cylinder 64, the levers 66, 66 and 63, 63 will rotate in a clockwise direction as viewed in Figure 7, until the crop pickup 11 is lowered and the shoes 54 on each side rest on the ground. A spring 69 connected between the frame 17 and the second lever 66 fixed to the tube 68 serves to rotate the levers 66, 66 to the limit of their travel in the clockwise direction as viewed in Figure 7 and completely retract the piston of cylinder 64, providing substantial clearance between the levers 66, 66 and the flanges 67, 67 of the levers 63, 63, thus providing sufficient lost motion between the levers to permit the crop pickup 11 to freely follow the contour of the ground.

The spring pressure on the roll 15 urging it against the rolls 12 and 14 may be released for clearing stoppages from the rolls by a trip mechanism consisting of a pair of inverted V shaped members 70, 70 free to turn on the fixed pivot of the shafts 60, 60. A connecting rod 71 links the members 70, 70 for simultaneous pivotal movement. One free end of each of the V shaped members 70, 70 is journalled on the adjacent shaft 60 and the other free end is connected to a pivot 72 between the telescoping and fixed length links 41 and 42 at each end of the roll 15 by a link 74. The arrangement is such that, as the members 70, 70 are rotated counterclockwise as viewed in Figures 2 and 7 to a position in which the rod 71 is resting against the frame 17, the pivotal connection between the links 74, 74 and the members 70, 70 will be over center or behind the pivotal connection between the members and the shaft 60 so as to retain the telescoping and fixed length links 41 and 42 aligned for pressing the roll 15 against the rolls 12 and 14. However, the tractor operator may rotate the members 70, 70 in a clockwise direction as viewed in Figures 2 and 7 from the tractor seat by means of a rope having an end connected to the rod 71, so as to lower the pivot 72 adjacent each end of the roll 15 and release the roll 15 for clearance of stoppages. Releasing the roll 15 does not interrupt the drive to the roll 15, as will be explained.

The roll 15 may be restored to its operative position by actuation of the hydraulic cylinder 64. This is accomplished by a link 75 having one end pivotally connected to the clevis 65 and having an elongated slot 76 receiving the rod 71 connecting the members 70, 70. The arrangement is such that as the cylinder 64 is actuated, not only is the pickup 11 raised, but also the members 70, 70 are rotated to their counterclockwise position so as to raise the links 74, 74 and restore the roll 15 to operative position. The slot 76 provides necessary lost motion for permitting the cylinder 64 to return to fully retracted position for lowering and releasing the crop pickup 11 while the members 70, 70 are still in their counterclockwise position of Figures 2 and 7.

The power drive for the hay conditioner is through the power drive shaft 77 generally indicated in the drawings extending between the tractor rear axle 22 and the mower 30. The shaft 77 drives a mower 30 of the reciprocating sickle bar type, a somewhat similar mower being more completely disclosed in Richey Patent 2,796,868. The mower 30 is supported from the tractor rear axle 22 by a conventional three-point hitch including liftable draft links, one link 83 being shown, and a top link 88. The shaft 77 drives a mower sheave 78. The drive from the shaft 77 extends through the hub of sheave 78 and to a pair of bevel gears 80, 80 received within a right angle drive gear housing 81 supported from the frame 82 of the mower. A telescoping shaft 84 transmits the drive from the housing 81 to a pulley 86 supported on a forward extension 87 of the frame 17. Universal joints 85, 85 are located at each end of the shaft 84, and permit the mower 30 to break back in the normal manner when encountering an obstruction.

A second pulley 89, fixed to the axle of the roll 12 is driven from the pulley 86 by means of a V belt 90. A sprocket 91 fixed to the axle at the opposite end of the roll 12 drives a chain 92 which, in turn, drives the sprockets 94 and 95 fixed to the axles of rolls 12 and 15 respectively (see Figure 11). The drive chain 92 is maintained under uniform tension despite movement of the roll 15 by an idler sprocket 96 carried on a lever 97 pivotally mounted on the side plate 36 and having an intermeshing relation with a second lever 99 also journalled on the plate 36 and having an arcuate slot 100 near its lower end receiving a stud 101 mounted on the adjacent fixed-length link 42 (Figure 11). The arrangement is such that rearward movement of the roll 15 and fixed length link 42 away from rolls 12 and 14 rotates the lever 99 counterclockwise as viewed in Figure 11 so as to in turn rotate the lever 97 clockwise, and move the idler sprocket forwardly to compensate for the rearward movement of the sprocket 95 with the roll 15 and keep the drive chain 92 uniformly tensioned.

The crop pickup 11 is driven from a sprocket 102 fixed to the opposite end of the axle of roll 15 through a chain 104 and a sprocket 105 fixed to the axle of the pickup. If desired, a chain tightener 106 of a common type can be mounted on the swinging link 51 to provide for adjustment of the chain.

Referring now to the diagrammatic view of Figure 10, the crop pickup 11 and rolls 12, 14, and 15 are arranged as above described so that the roll 15 presses against rolls 12 and 14, roll 14 being generally directly above roll 12. Rolls 12 and 15 are counterrotated in such a direction that the adjacent faces of the rolls move upwardly. The crop pickup 11 rotates with its lower edge moving forwardly in the direction of movement of the hay conditioner. The pickup will raise the layer of toppings generally as indicated in the drawings, throwing the toppings upwardly and slightly forwardly into the nip or contact of rolls 12 and 15.

The rolls 14 and 15 are also counterrotating, the adjacent surfaces of the rolls turning upwardly so as to receive the layer of toppings from the nip of rolls 12 and 15, and pass the layer upwardly and slightly to the rear as indicated in the drawings. The layer of toppings then strikes the baffle 16 and is deflected rearwardly and downwardly to fall behind the machine.

It is desirable to turn the contacting rolls of the series, i.e., rolls 12 and 15 and rolls 14 and 15, at slightly different speeds in order to obtain scouring or self cleaning of the rolls due to relative movement between the roll surfaces. Also, it has been found desirable to choose peripheral speeds of the rolls such that the nip of rolls 12 and 15 will tend to propel the layer of toppings at a greater speed than the nip of rolls 14 and 15 so as to cause buckling of the stems and possibly some turning of the stems towards a position parallel with the nip of the rolls so that there will be a rolling action in their passage between rolls 14 and 15. Also, it is desirable to have the peripheral speed of roll 12 slightly greater than that of the roll 15 so as to tend to turn the layer of toppings rearwardly towards the nip of rolls 14 and 15. The space between rolls 12 and 14 should be held to a minimum in order to prevent build up of material in the generally triangular-shaped area between the three rolls.

We claim:

1. In combination, a tractor having a rear axle housing, a pair of liftable, trailing draft links and a power take-off shaft, a mower carried at the rear of the tractor by said draft links and adapted to be raised from and lowered into operating position thereby, driving means for driving the mower from the tractor power take-off shaft, a hay conditioner to the rear of the mower and comprising a frame, at least two laterally extending counterrotating rolls supported by the frame and adapted to receive hay therebetween and physically rupture it for more rapid drying, a pair of caster wheels carried by the frame for supporting the frame with the rolls adjacent the ground, a pair of laterally spaced draw bars extending between the rear axle housing of the tractor and the conditioner frame, at least one of the draw bars extending above the mower and being arched upwardly between its ends to provide clearance for raising the mower from operating position, and power drive means extending between the mower and hay conditioner for driving the conditioner rolls.

2. In combination, a tractor having liftable draft links and having a power take-off shaft, a mower carried at the rear of the tractor by said draft links and adapted to be raised from and lowered into operating position thereby, driving means for driving the mower from the tractor power take-off shaft, a hay conditioner to the rear of the mower and comprising a frame, at least two laterally extending counterrotating rolls supported by the frame and adapted to receive hay therebetween and physically rupture it for more rapid drying, a pair of caster wheels carried by the frame for supporting the frame with the rolls adjacent the ground, a pair of laterally spaced draft links extending between the tractor and the conditioner frame, and driving means for driving the conditioner rolls from the mower.

3. In combination, a tractor having hitch means and having a power take-off shaft, a mower carried at the rear of the tractor by said hitch means and adapted to be raised from and lowered into operating position thereby, driving means for driving the mower from the tractor power take-off shaft, a hay conditioner to the rear of the mower and comprising a frame, at least two laterally extending counterrotating rolls supported by the frame and adapted to receive hay therebetween and physically rupture it for more rapid drying, a pair of caster wheels carried by the frame for supporting the frame, draft links extending between the tractor and the conditioner frame, and power drive means extending between the mower and hay condition for driving the conditioner rolls from the mower.

4. In combination with a tractor having a mower operatively connected thereto and a power drive from the tractor to the mower, a crop conditioner having crop conditioning rolls thereon and operatively connected to the tractor independently of the connection to the mower, and power drive means between the mower and the crop conditioner rolls.

5. In combination with a tractor having a pair of liftable, trailing draft links, a mower supported on said draft links, and a drive shaft extending from the tractor to the mower; a crop conditioner having at least two opposed crop conditioning rolls, a draft hitch independent of the draft links and extending between the tractor and the conditioner, and a drive line extending from the mower to the crop conditioner.

6. The combination of a tractor, mower, hay conditioner and draft links and driving means for the mower and hay conditioner as claimed in claim 2, in which one of the draft links extending between the tractor and hay conditioner is rigidly attached to the hay conditioner frame and the other draft link is pivotally mounted to the hay conditioner frame.

References Cited in the file of this patent
UNITED STATES PATENTS

| | | |
|---|---|---|
| 1,276,205 | Frost | Aug. 20, 1918 |
| 2,286,095 | Innes | June 9, 1942 |
| 2,592,269 | Getz | Apr. 8, 1952 |
| 2,718,746 | Prischmann | Sept. 27, 1955 |
| 2,727,348 | Arend | Dec. 20, 1955 |
| 2,788,988 | Happe | Apr. 16, 1957 |
| 2,811,819 | Heth | Nov. 5, 1957 |